(12) United States Patent
Hayashi et al.

(10) Patent No.: US 7,985,392 B2
(45) Date of Patent: Jul. 26, 2011

(54) CAKE OF EASILY DISPERSIBLE PRECIPITATED SILICA

(75) Inventors: Hirokatsu Hayashi, Shunan (JP); Kenji Fukunaga, Shunan (JP); Kentaro Fukuda, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 1597 days.

(21) Appl. No.: 10/520,466

(22) PCT Filed: Jul. 4, 2003

(86) PCT No.: PCT/JP03/08529
§ 371 (c)(1),
(2), (4) Date: Jan. 7, 2005

(87) PCT Pub. No.: WO2004/007366
PCT Pub. Date: Jan. 22, 2004

(65) Prior Publication Data
US 2006/0154004 A1   Jul. 13, 2006

(30) Foreign Application Priority Data

Jul. 10, 2002  (JP) .................................. 2002-201111
Jul. 10, 2002  (JP) .................................. 2002-201112

(51) Int. Cl.
*C01B 33/12* (2006.01)
*C01B 33/193* (2006.01)
*C01B 33/143* (2006.01)
*C08K 3/36* (2006.01)

(52) U.S. Cl. ........ 423/339; 428/32.37; 516/82; 524/493

(58) Field of Classification Search ................. 423/335, 423/32.34, 339; 428/32.34, 32.37; 524/460, 524/492, 493; 516/64, 81, 82, 86, 87
See application file for complete search history.

(56) References Cited

U.S. PATENT DOCUMENTS

| | | | | |
|---|---|---|---|---|
| 2,601,235 A * | 6/1952 | Alexander et al. | ........... | 423/339 |
| 5,342,598 A | 8/1994 | Persello | | |
| 5,637,636 A * | 6/1997 | Cartwright et al. | ........... | 524/493 |
| 5,964,937 A * | 10/1999 | Stanier | ........... | 106/492 |
| 5,968,470 A | 10/1999 | Persello | | |
| 6,143,066 A * | 11/2000 | Bomal et al. | ................... | 106/492 |
| 6,169,135 B1 * | 1/2001 | Chevallier et al. | ............ | 524/492 |
| 6,221,149 B1 * | 4/2001 | Bomal et al. | ................... | 106/492 |
| 6,268,424 B1 * | 7/2001 | Blume et al. | ................... | 524/493 |
| 6,335,396 B1 * | 1/2002 | Chevallier et al. | ............ | 524/492 |
| 6,417,264 B1 * | 7/2002 | Kono et al. | ................... | 524/493 |
| 6,468,493 B1 * | 10/2002 | Chevallier et al. | ............ | 423/339 |
| 6,616,916 B1 * | 9/2003 | Karpe et al. | ................... | 424/49 |
| 6,656,241 B1 * | 12/2003 | Hellring et al. | ................ | 51/308 |
| 6,866,711 B2 * | 3/2005 | Sinclair et al. | ............... | 106/461 |
| 6,946,119 B2 * | 9/2005 | Gallis et al. | ..................... | 424/49 |
| 2003/0039808 A1 * | 2/2003 | Ichinose et al. | .............. | 428/195 |
| 2004/0143050 A1 * | 7/2004 | Gatti et al. | .................... | 524/420 |

FOREIGN PATENT DOCUMENTS

| | | | |
|---|---|---|---|
| EP | 0 535 943 | | 4/1993 |
| EP | 535943 | | 4/1993 |
| EP | 1013605 A2 | * | 6/2000 |
| JP | 61-141584 | | 6/1986 |
| JP | 3-45511 | | 2/1991 |
| JP | 03-045511 | * | 2/1991 |
| JP | 5-208808 | | 8/1993 |
| JP | 05-208808 A | * | 8/1993 |
| JP | 7-223810 | | 8/1995 |
| JP | 07-223810 A | * | 8/1995 |
| JP | 9-142827 | | 6/1997 |
| WO | WO 98/54090 | * | 12/1998 |

OTHER PUBLICATIONS

Japanese Office Action issued Jan. 5, 2009 in Japanese Application No. 2003-192184 (Partial Translation).
Partial English translation of JP 7-223810, previously cited with its abstract in the Information Disclosure Statement of Apr. 5, 2005.

* cited by examiner

*Primary Examiner* — Emily Le
*Assistant Examiner* — Brittany M Martinez
(74) *Attorney, Agent, or Firm* — Wenderoth, Lind & Ponack, L.L.P.

(57) ABSTRACT

An easily dispersible cake of precipitated silica, wherein the precipitated silica has a BET specific surface area of at least 220 $m^2/g$. When the cake is dispersed in ion-exchange water to provide an aqueous dispersion of the silica of 5% by weight in concentration and further diluted to reduce the silica concentration to 1.5% by weight, the dispersion has a light-scattering index (n-value) of at least 2. The easily dispersible cake can be obtained by simultaneously adding an alkali silicate and a mineral acid to a reaction liquid whose pH is being maintained at a fixed value within a range of 7.5-11.5 and whose temperature is being maintained at 92-98° C., thus forming precipitated silica through their reaction, and separating the precipitated silica from the reaction liquid in wet state.

1 Claim, No Drawings

CAKE OF EASILY DISPERSIBLE PRECIPITATED SILICA

The application is a U.S. national stage of International Application No. PCT/JP03/08529 filed Jul. 4, 2003.

TECHNICAL FIELD

This invention relates to novel precipitated silica cake constituted of precipitated silica obtained by a precipitation process (wet process), a precipitated silica dispersion formed by dispersing said precipitated silica cake in polar solvent, and to a coating liquid for ink-jet recording sheet (hereafter may be simply referred to as "coating liquid") comprising said precipitated silica and a binder as dispersed in a polar solvent. More particularly, the invention relates to cake of precipitated silica which exhibits very excellent dispersibility in occasions of being dispersed in a polar solvent such as water, although said silica has a small primary particle sizes; a precipitated silica dispersion in which said precipitated silica cake is dispersed; and a coating liquid excelling in transparency and stability, comprising precipitated silica of relatively small primary particle size in very highly dispersed state.

BACKGROUND ART

Silica dispersions have been used for various coating agents for imparting gas-barrier property, anticorrosion property, hydrophilicity, gloss, liquid absorptive property or the like to not only ink-jet recording sheet but also paper, film, resin, glass and the like, and also as semiconductor wafers, polishing material for IC insulating membrane, or as emulsion stabilizing agent, and the like.

Heretofore, colloidal silica has been the representative material for silica dispersions which are conveniently used for such usages. Colloidal silica is prepared from sodium silicate solution as the starting material, through steps of removing sodium ion therefrom with e.g., ion exchange resin, suitably concentrating and stabilizing the concentrate by pH adjustment with ammonia or the like. Because such preparation steps are followed, silica dispersions in which silica is stably and thoroughly dispersed can be obtained.

Whereas, with increasing need for silica dispersions in these years, development of a process for making silica dispersions of high productivity is in demand, to replace colloidal silica of low productivity.

Furthermore, in ink-jet recording sheet which is one of usages for silica dispersions as aforesaid, such a silica dispersion is used as a starting material for a coating liquid to form an ink absorbing layer on one or both surfaces of the support such as paper. Properties generally required for such absorbing layers on ink-jet recording sheet are that both transparency and liquid absorbing property are high. However, ink absorbing layers made of said colloidal silica as the starting material of the coating liquid is subject to a problem that its liquid absorbing property is low, although its transparency is high.

As a process to meet aforesaid demand, precipitated silica which is prepared by a process referred to as "precipitation process" comprising reacting an aqueous solution of alkali silicate with acid to precipitate silica particles is gathering attention as a material for said dispersions, because it excels in productivity and liquid absorbing property.

For making a highly transparent dispersion liquid in which silica particles are highly dispersed, using such precipitated silica, the silica particles must necessarily have small primary particle size, i.e., have high specific surface area. Whereas, precipitated silica has strong cohesive force, and particularly when precipitated silica of high specific surface area is used, the cohesive structure of aggregated particles becomes rigid and it is difficult to reduce it to the state of fine aggregated particles in a polar solvent.

Hence an attempt was made for improving their dispersibility, in which the precipitated silica obtained through the steps of said reaction, filtration and washing was not dried but recovered as aqueous cake and whereby rendered less cohesive, and the precipitated silica particles were dispersed in a polar solvent in said caked state [JP Hei 9 (1997)-142827A].

However, even when such a method is adopted, where precipitated silica of high specific surface area is used, it is industrially difficult to obtain the precipitated silica cake having high dispersibility, and the current state of the art is not only many hours and much labor are required for obtaining dispersions in which the precipitated silica is highly dispersed, but satisfactorily dispersed state is not yet accomplished.

Accordingly, therefore, the object of the present invention is to provide a precipitated silica cake which, regardless of high specific surface area of the precipitated silica, exhibits very high disintegrating ability and markedly improved dispersibility in polar solvent; a precipitated silica dispersion in which said precipitated silica cake is dispersed; and a coating liquid excelling in transparency and stability, which contains precipitated silica of relatively small primary particle size in extremely well dispersed state.

We have engaged in concentrative studies with the view to accomplish the above object, and have now succeeded in obtaining silica cakes which have weakly cohesive structure although the silica has small primary particle size and are easily dispersible, by carrying out the precipitated silica-producing reaction under limited, prescribed conditions. The present invention is whereupon completed.

Thus, according to the present invention, an easily dispersible cake of precipitated silica (which may be hereafter referred to simply as "silica cake") is provided, which is characterized in that it has a BET specific surface area of at least 220 m$^2$/g and, when it is dispersed in ion-exchange water to provide an aqueous dispersion of the silica of 5 wt % concentration and further diluted to reduce the silica concentration to 1.5 wt %, the dispersion has a light-scattering index (n-value) of at least 2.

According to the present invention, also a process for producing an easily dispersible precipitated silica cake is provided, which comprises subjecting an alkali silicate and a mineral acid to a neutralizing reaction and filtering, washing and de-watering the reaction product, the characteristic features residing in that the alkali silicate and the mineral acid are added to a reaction liquid simultaneously while maintaining the pH value of the reaction liquid at a constant value within a range of from 7.5 to 11.5 and the temperature at no lower than 90° C., to produce precipitated silica; and the precipitated silica is separated from the reaction liquid in wet state.

The invention furthermore provides a precipitated silica dispersion which is a dispersion of said easily dispersible precipitated silica in a polar solvent, characterized in that the average particle size of said silica particles in said dispersion is not greater than 300 nm and the ratio of the aggregated particles having a size not less than 500 nm is no more than 5 volume percent.

According to the invention, moreover, there is provided a coating liquid for ink-jet recording sheet, which coating liquid is characterized in that it is formed of a polar solvent containing precipitated silica having a BET specific surface area of at least 220 m$^2$/g and a binder, and that the percent transmission measured of said coating liquid as diluted to the silica concentration of 1.5 weight percent is at least 20%.

DISCLOSURE OF THE INVENTION

In the present invention the term, precipitated silica, collectively refers to all silica which is produced by precipitation process.

Generally in precipitation process an aqueous alkali silicate solution and a mineral acid are reacted to precipitate silica in the reaction liquid, and by successively filtering the precipitated silica and washing the same with water, the precipitated silica cake is recovered. In the present invention, such a hydrous solid of precipitated silica recovered by filtration and washing, still retaining the hydrous state without being dried, is referred to as "aqueous cake" or "cake".

The precipitated silica which constitutes the silica cake of the present invention has a BET specific surface area of at least 220 $m^2/g$, preferably within a range of 240-400 $m^2/g$, inter alia, 250-350 $m^2/g$.

Silica cake formed of precipitated silica having BET specific surface area less than 220 $m^2/g$ disperses with relative ease, but it is difficult to produce highly transparent precipitated silica dispersions with such precipitated silica having the particle sizes corresponding to said BET specific surface areas, as demonstrated also in later-appearing Examples.

"BET specific surface area" relates to the specific surface area measured applying the multilayer adsorption theory presented in S. Brunaure, P. H. Emmett, and E. Teller, *J. Am. Chem. Soc.*, 60, 309 (1938), which is regarded to correspond to average primary particle size of silica. For example, as explained in *Kaitei Zoho, Fun tai Bussei Zusetsu* (revised and supplemented; powder physical properties with illustration), ed. by Powder Engineering Society, et al. (1985), where primary particles are assumed to be spherical, the correlation between their specific surface area and average primary particle size can be expressed by the following equation (1), i.e., the greater the specific surface area, the less the average primary particle size:

$$D=6/(S \cdot \rho) \quad (1)$$

(wherein D stands for average primary particle diameter; S, for specific surface area and $\rho$, for the particle density).

This silica cake of the present invention is characterized in that it exhibits excellent dispersibility in polar solvent, regardless its relatively great BET specific surface area as aforesaid.

That is, when a silica cake according to the invention is disintegrated into fine particles in ion-exchange water by the method described later, to provide an aqueous dispersion of 5 wt % silica concentration and then diluted to the silica concentration of 1.5 wt %, the dispersion has a light-scattering index (n-value) of at least 2, preferably at least 2.1, inter alia, at least 2.2.

Said n-value is an index for expressing dispersed state of silica in dispersions, which increases with improvement in dispersibility. Hence, it is taken that the higher the n-value, the more finely dispersed state is achieved, and the value provides an index for ease in disintegration of silica cake's aggregated structure.

Said n-value is measured following the method which is described in *Journal of Ceramic Society of Japan*, 101 [6], 707-712 (1993). Namely, measuring the spectra of a dispersion within a wavelength ($\lambda$) range of light from 460 nm to 700 nm with a commercial spectrophotometer to determine the absorbance ($\tau$) and plotting log ($\tau$) against log ($\lambda$), the gradient (−n) in the straight line is calculated by least-squares fitting method, using the following equation (2):

$$\tau = \alpha \lambda^{-n} \quad (2)$$

(wherein $\tau$ stands for absorbance, $\alpha$ is a constant, $\lambda$ stands for wavelength of light, and n, for light-scattering index).

In the above-described measurement of n-value, the aqueous dispersion of 5 wt % silica concentration which is prepared using the hydrous cake of precipitated silica is obtained through the following procedures: adding ion-exchange water to said hydrous cake to attain the prescribed silica concentration and mixing the system with a propeller mixer to effect a preliminary dispersion, the resultant slurry is treated with a high-pressure homogenizer once at a processing pressure of 78 MPa to be finely divided.

As aforesaid, it is necessary to use precipitated silica having a high specific surface area, to improve transparency of precipitated silica dispersion. Whereas, again as aforesaid primary particles of precipitated silica having a specific surface area not less than 220 $m^2/g$ show very high cohesion. Dispersions made from conventional silica cake, consequently, have said n-values around 1.6 at the most, due to insufficient dispersibility. Where n-value is less than 2, the precipitated silica dispersions prepared from such silica cakes as the starting material have reduced transparency, which also leads to reduction in transparency of coating liquids for inkjet recording sheet using those precipitated silica dispersions as the starting material. That is, when the coating liquid has a reduced transparency, transparency of ink-absorbing layer decreases as aforesaid, and the light and shade of ink driven into said sheet become obscure, the resultant images fail to express color depths and satisfactory photographic picture quality cannot be obtained.

By contrast, silica cakes of the present invention have high n-values of at least 2 and show very high dispersibility. By dispersing the silica cakes showing such high n-values in polar solvent, stable silica dispersions of very high transparency can be obtained.

Although silica cakes of the present invention are not particularly limited by any conditions other than the foregoing, it is preferred that their moisture contents lie within a range of 83-93 wt %, for easier dispersion in polar solvent in the occasion of preparing silica dispersions therefrom. Still more preferred moisture content ranges 85-92 wt %.

Furthermore, the pH values of 5 wt % dispersions formed by dispersing those silica cakes in water favorably lie in the range of 3-7, for still further improved silica cake dispersibility. Even better pH values range 3.5-6.5.

While production process of silica cakes of the present invention is subject to no particular limitation, as a typical example a process may be used, which comprises maintaining pH of a reaction liquid at fixed level within a range of 7.5-11.5 and maintaining the temperature at no lower than 90° C., adding alkali silicate and mineral acid to the reaction liquid simultaneously to effect their reaction and produce precipitated silica; and separating said precipitated silica in wet state from said reaction liquid.

In the above-described production process, sodium silicate, potassium silicate and the like can be used as alkali silicate, generally for industrial starting material sodium silicate being used. Alkali silicate in general is expressed by a chemical formula of $M_2O \cdot xSiO_2$, M standing for an alkali metal (Na or K) and x standing for $SiO_2/M_2O$ molar ratio.

The molar ratio x in said alkali silicate, $SiO_2/M_2O$, which is used in the production process of silica cake according to the present invention, is not critical, while generally alkali silicate in which said molar ratio is 2-4, preferably 3.0-3.5, can be conveniently used. The alkali silicate concentration at the time of use again is subject to no critical limitation, but any commercial product available for industrial use may be added to the reaction liquid as it is, or may be suitably diluted before use. Generally adopted $SiO_2$ concentration at the time of using alkali silicate is 50-300 g/L.

As the mineral acid, sulfuric acid, hydrochloric acid, nitric acid and the like can be used, sulfuric acid being generally used for industrial purpose. Concentration of such mineral acid also is not critical, but any commercial product available for industrial use may be added to the reaction liquid as it is, or may be suitably diluted before use.

Hereinafter the production process of silica cake of this invention is explained in further details, in which the reaction liquid to which alkali silicate and mineral acid are not yet simultaneously added is referred to as initial reaction liquid.

In the occasion of producing a silica cake of the present invention, first an initial reaction liquid is charged in a reaction vessel, and while agitating the content with propeller blades or the like, its temperature is adjusted in advance to a level not lower than 90° C. (a temperature to be maintained during the reaction of alkali silicate and mineral acid, as later described) by such means as external or internal heating with a heater or introduction of steam or the like.

Said initial reaction liquid may be an aqueous alkali silicate solution of suitable concentration; aqueous alkaline solution with its pH suitably adjusted with a basic substance such as sodium hydroxide, aqueous ammonia, amines or the like, preferably an aqueous alkaline solution whose pH value is adjusted in advance to a fixed level within a range of 7.5-11.5 (a pH value to be maintained during the reaction of alkali silicate with mineral acid as later described); or may be water. In general, use of an aqueous alkali silicate solution of adequate concentration, e.g., of a concentration adjusted to about 1-50 g/L in terms of $SiO_2$ concentration, as the initial reaction liquid tends to facilitate maintenance of the pH at a fixed level and also makes it sufficient to use only a small amount of a mineral acid and, therefore, is preferred. While an electrolyte, generally sodium sulfate, can be added to the initial reaction liquid as commonly practiced in production processes of precipitated silica by precipitation method, an electrolyte acts also as a flocculant and tends to reduce BET specific surface area. Hence, in a case like the present invention for producing silica cakes having high BET specific surface area and good dispersibility, it is preferable not to use it. Furthermore, where an aqueous alkali silicate solution is used as the initial reaction liquid, a mineral acid can be fed to the solution in advance of initiating the simultaneous addition of alkali silicate and mineral acid, to adjust pH of the system or else. Whereas, such advance feeding of a mineral acid induces occurrence of a neutralizing reaction between said acid and the alkali silicate in said initial reaction liquid, to form a minor amount of silica or aforesaid electrolyte and render production of highly dispersible precipitated silica cake as intended by the present invention difficult. It is, therefore, preferred that the initial reaction liquid is an aqueous alkali silicate solution free of mineral acid.

Agitation of the reaction liquid is not critical, so long as homogeneity can be maintained, i.e., so long as maldistribution in the components' concentration in the reaction liquid or localized precipitation of precipitatable solid can be avoided. It is sufficient to agitate or disperse the reaction liquid with ordinary stirrers having propeller blades, turbin blades, paddle blades or the like; high-speed rotatory centrifugal radiation-type stirrers such as disper mixer or the like; high-speed rotatory shear-type stirrers such as homogenizer, homomixer, ultramixer or the like; and dispersers such as colloid mill, planetary mixer or the like. Agitation by circulation of the reaction liquid may also be adopted, in which a part of the reaction liquid is extracted with a pump for liquid transportation or the like and fed back to the system from a different position.

According to the invention, it is important to conduct the operation of simultanuous addition of alkali silicate and mineral acid to the initial reaction liquid which is maintained at a prescribed temperature and under uniform stirring, to produce precipitated silica through their neutralization reaction. It is also important for the present invention to maintain the reaction temperature at no lower than 90° C. and to maintain a constant pH value which is selected from a range of 7.5-11.5 during the operation.

The first characteristic feature of the present invention resides in maintaining the reaction temperature at no lower than 90° C. as above. Where the reaction temperature is lower than 90° C., the resulting silica cake shows a lower dispersibility and the later explained dispersibility index (n-value) becomes less than 2. In particular, the reaction temperature range of 92-98° C., inter alia, 93-97° C., is preferred in practicing the reaction.

The second characteristic feature of the present invention is to maintain a constant pH value selected from the above-specified range of 7.5-11.5. Where the pH value fluctuates largely, again the resulting silica cake shows inferior dispersibility. Nevertheless, minor pH variation is permissible, the variation width being preferably within ±0.3, inter alia, ±0.2. Where the pH value of the reaction liquid is lower than 7.5, such inconveniences are caused as that the reaction becomes unstable and the reaction liquid tends to be gelled; and where it exceeds 11.5, the productivity is reduced. Preferred pH value range is 8-11, in particular, 9-11, for easier maintenance of a constant pH value.

The third characteristic feature of the present invention resides in adoption of the operation to simultaneously add alkali silicate and mineral acid to the reaction liquid, as a means for maintaining pH of the reaction liquid at a constant value as above. As means for keeping a constant pH value, feeding a buffer agent, an alkali such as sodium hydroxide, or mineral acid other than the one which is to be simultaneously added with alkali silicate, or the like to the reaction liquid could be considered. However, when a buffer agent is added, its residue deposits on the formed silica cake, which may have an adverse effect as an impurity during preparation of the silica dispersion (e.g., making the pH adjustment difficult or aggravating compatibility with other additives). Addition of an alkali such as alkali hydroxide or a different mineral acid as aforesaid in substance is same to changing the kinds, concentration level(s) and molar ratio x of alkali silicate and mineral acid, which is an operation within the scope of the present invention.

In precipitation method for synthesizing precipitated silica by neutralizing alkali silicate with mineral acid, generally the reaction is conducted under alkaline condition in the reaction liquid having a pH of at least 7, from initiation of the neutralizing reaction until at least silica precipitation takes place. The reaction systems in that occasion can be largely classified into two: a process of adding a mineral acid to an alkali silicate solution whose concentration has been adjusted to a suitable level (reaction system A), and a process of simultaneously adding alkali silicate and mineral acid to a reaction liquid under prescribed conditions (reaction system B) which is adopted by this invention. Of these reaction systems A and B, it is preferred to adopt the reaction system B, i.e., a process of simultaneously adding alkali silicate and mineral acid to a reaction liquid under prescribed conditions, because it enables easy acquisition of a silica cake having high specific surface area and excellent dispersibility.

Furthermore, while it is possible to use as the initial reaction liquid an alkali silicate solution to which a mineral acid has been added, in such a system an electrolyte is produced at an early stage of the neutralizing reaction and which acts as a flocculant and tends to reduce the product's BET specific surface area. It is, therefore, preferred not to add a mineral acid before the simultaneous addition of alkali silicate and mineral acid, for producing a silica cake of a high BET specific surface area and good dispersibility as aimed at by the present invention.

More specifically, the reaction to synthesize a silica cake of the present invention adopting the reaction system B is carried out as follows: charging a reaction tank with an aqueous sodium silicate solution in which the molar ratio x and the $SiO_2$ concentration have been adjusted to 2-4 and 1-50 g/L, respectively, as the initial reaction liquid and while stirring to homogeneity, the reaction temperature is adjusted to not lower than 90° C. Continuing the uniform stirring and maintaining said reaction temperature, an aqueous sodium silicate solution in which the molar ration x and the $SiO_2$ concentration have been adjusted to 2-4 and 50-300 g/L, respectively, and sulfuric acid whose concentration has been adjusted to make its $H_2SO_4$ content about 100-1000 g/L, are simultaneously added to said initial reaction liquid, while pH of the system is adjusted to a constant level within a range of 7.5-11.5. Silica particles are formed, and after precipitation of the silica is confirmed, the simultaneous addition is continued until the desired BET specific surface area is attained. Thereafter the reaction liquid is stabilized by adding sulfuric acid only, to adjust the pH to 2-6 and terminate the reaction.

The production process of silica cake of the present invention requires simultaneous addition of alkali silicate and mineral acid under controlled conditions to keep the pH at a fixed level. In particular, it is important for obtaining highly dispersible precipitated silica cake, to start addition of alkali silicate and mineral acid simultaneously to the initial reaction liquid and to follow the reaction system B until at least the formed silica particles start to precipitate.

The particulars of the reaction mechanism are not yet clear, but presumably because pH is maintained at a prescribed level and alkali silicate and mineral acid are added simultaneously according to the silica cake-producing process of the present invention, concentration of the alkali silicate which is not neutralized and remains in the reaction liquid is maintained at an approximately constant level, which is thought to contribute to formation of precipitated silica cake having a high dispersibility. Whereas, in case of the reaction system A wherein a mineral acid is added to an alkali silicate solution, not only it is difficult to maintain a prescribed pH level but also the concentration of the alkali silicate which is not neutralized and remains in the reaction liquid gradually changes (decreases) with addition of the mineral acid, and hence precipitated silica showing low dispersibility is presumed to form in occasions. After practicing the simultaneous addition of alkali silicate and mineral acid until a desired BET specific surface area is attained, it is desirable to add the mineral acid alone to stabilize the reaction liquid and to render the pH not higher than 7, preferably 2-6. Stabilization of the reaction liquid can be effected by applying a step which is referred to as aging, e.g., by suspending the simultaneous addition of alkali silicate and mineral acid and stirring the reaction liquid for a prescribed length of time, or by continuing the stirring for a prescribed length of time after termination of the simultaneous addition, while maintaining the temperature at the same level.

According to a preferred embodiment of the production process of silica cakes of the present invention, concentration of the initial reaction liquid and those of the alkali silicate and mineral acid to be added simultaneously, and/or their amounts are so designed as to make the silica solid concentration in the reaction mixture at the end of the reaction not higher than 50 g/L, preferably 35-47 g/L. Such designing is effective for adjusting BET specific surface area of the resulting precipitated silica to a value within the earlier specified range.

According to the invention, suitable addition of an electrolyte, generally sodium sulfate, to the reaction liquid as has been commonly practiced in production processes of precipitated silica by precipitation method may also be done without any limitation. Whereas, as aforesaid an electrolyte acts as a flocculant and furthermore tends to reduce BET specific surface area and, therefore, non-use of an electrolyte is preferred for making precipitated silica cakes of high BET specific surface area and good dispersibility, like those of the present invention.

According to the present invention, further the precipitated silica is separated from the reaction liquid resulting from the above reaction by filtration, subsequently washed with water and/or dewatered where necessary, and isolated as wet silica cake. The water content of such a wet silica cake preferably lies in a range of 83-93% by weight, as such will further facilitate the cake's dispersion in the occasion of producing a silica dispersion therewith. Still more preferably, the content ranges 85-92% by weight.

For said filtration, washing with water and dewatering, generally a solid-liquid separation device such as a filter press is used. The washing with water is preferably practiced in such a manner that the dispersion formed by dispersing the resulting silica cake in water at a concentration of 5% by weight would have a pH of 3-7 and electric conductivity of 20-400 µS/cm, for still improved dispersibility of the silica cake. Still more preferably, the pH ranges 3.5-6.5 and the conductivity, 50-300 µS/cm.

Silica cakes according to the invention have very favorable dispersibility in polar solvent, and can provide silica dispersions in which precipitated silica is highly dispersed, through simple dispersion operation. That is, by dispersing a silica cake according to the present invention in a polar solvent, a highly transparent silica dispersion in which aggregated particles are highly dispersed such that the average particle size of the silica in the dispersion is not greater than 300 nm and the ratio of aggregated particles having a particle size of 500 nm or more is not more than 5% by volume can be obtained.

Such a silica dispersion in which aggregated particles are so highly dispersed as above has never been produced before, among silica dispersions obtained by dispersing precipitated silica in polar solvents. As the reason therefor, the following functional mechanism is inferred. That is, because conventional precipitated silica has broad primary particle size distribution, it contains a large amount of ultrafine primary particles having strong cohesive force and consequently it is substantially impossible to disperse the precipitated silica to such a highly dispersed state as that in the silica dispersion of the present invention. By contrast, precipitated silica in a silica dispersion according to the present invention has a narrowed primary particle size distribution due to the limitations incurred on the production conditions of the precipitated silica particles and hence has a small content of ultrafine primary particles and is inferred to exhibit the excellent dispersibility.

Precipitated silica dispersions according to the present invention are explained next.

In the present invention, average particle size shows that of aggregated silica particles in a precipitated silica dispersion and signifies volume-based arithmetic average diameter $D_{50}$ which is measured with a light-scattering diffraction-type particle size distribution analyzer.

Silica concentration in a precipitated silica dispersion of the present invention can be suitably adjusted to meet individual usage. While it is normally 8-15% by weight, it can be made higher than 15% by weight where necessary, by condensing by a method described later.

As a method for making precipitated silica dispersions using silica cakes of the present invention as the starting material, known slurrying method can be used without any particular limitation.

For example, a method comprising dispersing silica cake in a polar solvent with a disperser, after blending each a prescribed amount of the silica cake and the polar solvent; a method comprising charging a dispersing tank with a polar solvent in advance and while operating a disperser, throwing silica cake gradually thereinto to effect its dispersion; or the like can be named. Where necessary, furthermore, after dispersing the silica cake in a polar solvent by above-described means, a method of applying a high-grade pulverization means to the silica particles in the dispersion to further reduce their average particle size to a value within a suitable range is conveniently adopted.

Dispersing machines useful for above dispersion are subject to no particular limitation, examples of useful machines including ordinary stirrers having propeller blades, turbin blades, paddle blades or the like; high-speed rotatory centrifugal radiation-type stirrers such as disper mixer; high-speed rotatory shear-type stirrers such as homogenizer, homomixer, ultramixer or the like; and dispersers such as colloid mill, planetary mixer or the like.

Of the above-named dispersers, those having powerful shear force are preferred. More specifically, high-speed shear-type stirrer; composite disperser in which propeller blades, paddle blades and further a high-speed shear-type stirrer are combined; a composite disperser in which a planetary mixer is combined with a high-speed ratatory centrifugal radiation-type stirrer or a high-speed rotatory shear-type stirrer; or the like can be named.

According to the present invention, said high-grade pulverization method is not subject to any particular limitation. For example, pulverization processing using a bead mill, sand mill, ultrasonic homogenizer, high-pressure homogenizer or the like can be named. Of these, a dispersing processing using a high-pressure homogenizer is preferred.

By causing a pre-dispersion containing silica as dispersed in a polar solvent to collide head on at an operating pressure of at least 30 MPa or to pass through orifices under the condition that the pressure difference at the entrance side and exit side of the orifices is at least 30 MPa, using a high pressure homogenizer, a precipitated silica dispersion in which the precipitated silica has an average particle size not more than 300 nm, not more than 5% of aggregated particles therein having a size of 500 nm or more, can be obtained.

A precipitated silica dispersion thus obtained, furthermore, can be suitably subjected to such operations as dilution with polar solvent or various condensation to be given adequate concentration levels according to intended usages as aforesaid, without any problem.

For condensing said precipitated silica dispersion, known condensing means can be applied without any particular limitation. For example, evaporation condensation process conducted by raising the temperature to boiling point of the used polar solvent, reduced-pressure evaporation process conducted under a reduced pressure to lower boiling point of the polar solvent, or ultrafiltration process to remove the polar solvent using thin membrane of polysulfone, polyacrylonitrile, cellulose or the like under pressure exertion, can be used.

Polar solvent to be used in the present invention is subject to no critical limitation, so long as silica cake can be dispersed therein. For example, water; alcohols such as methanol, ethanol, 2-propanol and the like; ethers; and ketones can be used. Dispersing media formed by mixing two or more kinds of such solvents may also be used. In general, water is used conveniently.

For improving storage stability or dispersibility of silica particles, it is permissible to further add minor amounts of surfactant, antifungal agent, or the like, within a range not detrimental to the effect of the invention.

With the view to modify silica particles, which are anionic in polar solvent, to become cationic, silica cake of the invention may be mixed with cationic polymer in polar solvent and dispersed therein, whereby providing a precipitated silica dispersion in which cationically modified silica particles are dispersed, i.e., a dispersion of cationic polymer-modified precipitated silica.

Use of such a cationic polymer-modified precipitated silica dispersion as a starting material of coating liquid for ink-jet recording sheet can improve ink-anchoring property, moisture resistance and image deepness of ink-jet recording sheet which is applied with said coating liquid.

Any cationic polymer which dissociates when dissolved in water to reveal cationic property can be used without any particular limitation. Those polymers having primary to tertiary amine groups or quaternary ammonium base are convenient. As specific examples, polymers such as polyethyleneimine, polyvinylpyridine, polyaminesulfone, polydialkylaminoethyl methacrylate, polydialkylaminoethyl acrylate, polydialkylaminoethyl methacrylamide, polydialkylaminoethyl acrylamide, polyepoxyamine, polyamidamine, dicyandiamide-formaline condensate, dicyandiamidopolyalkyl-polyalkylenepolyamine condensate, polyvinylamine and polyallylamine and hydrochlorides thereof; polydiallyldimethylammonium chloride; copolymers of diallyldimethylammonium chloride with other monomer(s), e.g., acrylamide; polydiallylmethylamine hydrochloride; polymethacrylic acid ester methyl chloride quaternary salt; and the like can be named.

According to the invention, the amount of said cationic polymer to be blended is preferably 3-50 parts by weight, in particular, 3-15 parts by weight, per 100 parts by weight of silica, so as to enable stable production of intended cationic polymer-modified precipitated silica dispersion without gelation on half way of the production and to enable reduction in viscosity of the resultant cationic polymer-modified precipitated silica dispersion.

Where viscosity of the cationic polymer-modified precipitated silica dispersion becomes high, handling property of the dispersion in the subsequent production steps undesirably deteriorates. Because the stability of cationic polymer-modified precipitated silica dispersion versus the added amount of the cationic polymer varies depending on the kind of the added cationic polymer, it is desirable to select the optimum amount to be added of individual polymer at which the viscosity of the dispersion becomes the least, from the above-specified quantitative addition range, which can be determined by advance experiments.

Said method of preparing a cationic polymer-modified precipitated silica dispersion by mixing and dispersing silica cake of the present invention with cationic polymer in polar solvent is not subject to any particular limitation. For example, a process of mixing cationic polymer into a polar solvent in which silica cake has been dispersed and dispersing said polymer; or a process of slowly throwing silica cake into a mixture of polar solvent and cationic polymer, whereby effecting mixing and dispersing of the silica cake and cationic polymer; can be used. Where necessary, furthermore, a process comprising after preparing a cationic polymer-modified precipitated silica dispersion by above-described means, applying a high-grade pulverization means for further finely dividing the silica particles in the dispersion to the preferred range of the average particle size, is adopted with advantage.

According to the invention, a coating liquid for ink-jet recording sheet, which is formed of a polar solvent containing therein precipitated silica particles having BET specific surface area not less than 220 m$^2$/g and binder, can be obtained with ease, with use of the silica cake of the invention as described in the above, the characteristic feature of the coating liquid residing in that the percent transmission measured with said coating liquid as diluted to the silica concentration of 1.5% by weight is at least 20%.

The coating liquid according to the present invention is characterized in that the silica particles therein are very highly dispersed, although it contains precipitated silica having relatively high BET specific surface area. That is, the most prominent characteristics of the coating liquid of the present invention is that, when it is diluted to a silica concentration of 1.5% by weight, the percent transmission of the diluted liquid is at least 20%, in particular, at least 25%. Percent transmission is a transparency index of the coating liquid. Where the percent transmission is less than 20%, transparency of the ink-absorption layer obtained by application of said coating liquid is reduced, rendering shade and lightness of the ink punched onto the sheet ambiguous. The resulting images fail to give impressive color depths, and it becomes impossible to realize image quality comparable with that of photographs.

The percent transmission of said coating liquid according to the invention is the value determined as follows: the absorbance ($\tau$) at the measuring wavelength of 589 nm (NaD ray) of said coating liquid as diluted to silica concentration of 1.5% by weight with the polar solvent of the same kind with that constituting the coating liquid is measured with a spectrophotometer, and the percent transmission (T) is calculated from the following equation (3), $$T(\%) = 10^{(2-\tau)} \qquad (3).$$

Such a high transparency has never been precedented in conventional coating liquids which are obtained using precipitated silica particles having specific surface area of no less than 220 m$^2$/g, and this is an effect accomplished by using silica cake of the present invention.

As a binder to be used in the invention, any of those various, known binders used for preparation of coating liquids can be used. As specific examples of typical binders, polyvinyl alcohol and derivatives thereof, casein, starch, carboxymethylcellulose and the like can be named. Of these, polyvinyl alcohol or derivatives thereof are most effectively used, from the viewpoint of dispersion adaptability and paint stability. As said derivatives of polyvinyl alcohol, cation-modified polyvinyl alcohol or nonion-modified polyvinyl alcohol can be named. A mixture of two or more of said binders may also be used.

The blend ratio of the binder to precipitated silica according to the present invention can be similar to those adopted in general for known coating liquids, without any particular limitation. For example, it may be within 10-100 parts by weight, preferably 30-60 parts by weight, per 100 parts by weight of precipitated silica.

The precipitated silica concentration in the coating liquid according to the present invention is determined by the precipitated silica concentration in the starting precipitated silica dispersion, which is 5-30% by weight, preferably 5-20% by weight.

The coating liquid according to the present invention preferably further contains a cationic polymer. By having it contain a cationic polymer, ink-fixing property, water resistance and image density of an ink-jet recording sheet which is applied with said coating liquid can be improved.

As the useful cationic polymers, those similar to the cationic polymers in above-described cationic polymer-modified precipitated silica dispersions can be used.

It is also preferred to make the blended amount of such a cationic polymer 3-50 parts by weight, in particular, 3-15 parts by weight, per 100 parts by weight of the precipitated silica particles, to allow stable production of the coating liquid without gelation on halfway during the production and to reduce viscosity of resulting coating liquid.

The coating liquid according to the present invention can be prepared by dispersing a precipitated silica having BET specific surface area of at least 220 m$_2$/g and a binder in a polar solvent.

The method of dispersing the precipitated silica and binder in a polar solvent is not particularly limited, while generally a method comprising dispersing precipitated silica in a polar solvent and adding a binder to the resultant precipitated silica dispersion is convenient.

Use of silica cake of the present invention as the precipitated silica enables easy preparation of highly transparent coating liquid most suitable for use with ink-jet recording sheet. Therefore, it is preferred to use as the precipitated silica dispersion the one prepared by dispersing silica cake of the present invention in polar solvent. Where a coating liquid containing cationic polymer is to be prepared, aforesaid cationic polymer-modified precipitated silica dispersion can be used.

As the method for mixing said precipitated silica dispersion or cationic polymer-modified precipitated silica dispersion, in which silica cake of the present invention is dispersed in polar solvent, with binder to produce a coating liquid, any per se known method can be used without any particular limitation. For example, generally a method comprising throwing the precipitated silica dispersion or cationic polymer-modified precipitated silica dispersion and a binder into a mixing tank equipped with a common stirrer having propeller blades or turbin blades, or with a high-speed rotatory shear-type stirrer such as a homogenizer, homomixer or the like, and mixing the components is used.

So long as it dose not markedly reduce the effect of the present invention, known optional additive(s) may be added to the coating liquid of the present invention. Examples of typical additives include water resistance-improving agent such as cationic polymer or the like, ultraviolet absorbing agent, fluorescence whitening agent, surfactant, pH-regulator, defoaming agent, antifungal agent and the like.

Method for adding said optional additive(s) to the coating liquid is not subject to any particular limitation, but they may be added by any known method in the occasion of preparing aforesaid coating liquid. For example, they may be added to a mixture of the precipitated silica dispersion with the binder;

added to the binder or to the precipitated silica dispersion in advance of their mixing. Or they may be advancedly added in the occasion of dispersing the silica cake in polar solvent for making a precipitated silica dispersion.

The support for an ink-jet recording sheet prepared with use of the coating liquid of the present invention is not critical, but transparent or non-transparent supporting material can be suitably used, examples of which including films of plastics such as polyethylene, polypropylene, polyvinyl chloride, polyester and the like; papers such as paper of fine quality, art paper, polyethylene-laminated paper and the like; and synthetic paper.

BEST MODE FOR CARRYING OUT THE INVENTION

Hereinafter working Examples and Comparative Examples are shown for specifically explaining the present invention, it being understood that the invention is not limited to these Examples only.

The measurement methods used in relation with the silica cakes, silica dispersions and coating liquids are as follows.

[BET Specific Surface Area]

After a silica cake is dried in a dryer (120° C.) for at least 24 hours, its quantitative nitrogen adsorption is measured with ASAP 2010 by Micromeritics Co. and the single-point method value at a relative pressure 0.2 is adopted.

[Water Content of Silica Cake]

Three to ten (3-10) grams of a silica cake is measured out and placed in a weighing bottle and placed in a dryer maintained at 105° C. for at least 12 hours. The water content is calculated from the sample's weight before and after its water content is dried off.

[pH and Electric Conductivity of 5 wt % Dispersion in Silica Concentration]

A silica cake whose water content has been measured in advance and ion-exchange water are blended to reduce the silica concentration to 5% by weight, slurried by mixing and stirring with a propeller mixer, and measured with a commercial pH meter and electric conductometer at 25° C.

[n-Value]

To a silica cake whose water content has been measured in advance, ion-exchange water is added to make the silica concentration 5% which is pre-mixed by stirring with a propeller mixer and slurried.

Thus obtained slurry is processed once with a high-pressure homogenizer (Nanomizer: Nanomizer LA-31) at an operating pressure of 78 MPa, to form a silica dispersion. Then a visible light absorption spectrum of this silica dispersion is measured with a spectrophotometer (Nippon Bunko, Ubest-35 Model).

First using cells of optical path length 10 mm, each of the reference cells and sample cells are filled with ion-exchange water, and zero-point calibration is conducted over the total wavelength range. Then the silica dispersion is diluted with ion-exchange water until the silica concentration therein becomes 1.5% by weight, put in a sample cell and its absorbance ($\tau$) at wavelengths ($\lambda$) 460-760 nm is measured. Plotting log ($\lambda$) and log ($\tau$) the gradient (−n) in the straight line is calculated by least-squares fitting method, using the earlier given equation (2).

[Particle Size Distribution and Average Particle Size]

Using a light-scattering diffraction type particle size distribution analyzer (Coulter, Coulter LS-230), particle size distribution of precipitated silica dispersion is measured under the conditions of silica refractive index, 1.458 and that of the water which is used as the dispersing medium, 1.332, wherefrom the volume ratio of the particles having a size of 500 nm or more and the volume-based arithmetic average diameter $D_{50}$ are calculated. This volume-based arithmetic average diameter is indicated as the average particle size.

[Silica Solid Concentration in the Reaction Mixture at Termination of the Reaction]

One-hundred (100) mL of each reaction mixture is sampled after termination of the reaction, filtered through No. 5A filter paper, and the filtration residue is washed with 1L of ion-exchange water. Then the residue is dried in a dryer (120° C.) for at least 24 hours and measured of the dry weight which is indicated as the silica solid weight (g) in the unit volume of the reaction liquid (1 L) (unit: g/L).

[Transparency of Coating Liquid]

A sample coating liquid is diluted with ion-exchange water until its silica concentration is reduced to 1.5% by weight. The absorbance ($\tau$) of so diluted coating liquid is measured with a spectrophotometer (Nippon Bunko, Ubest-35 Model), and the transparency (T) is calculated using the earlier given equation (3). In said measurement, the optical path length of 10 mm and measuring wavelength of 589 nm (NaD ray) are adopted.

[Stability of Coating Liquid]

A sample coating liquid is allowed to stand for 5 days and formation of aggregate in the coating liquid is visually observed:

OO: formation of no aggregate is observed;
O: formation of aggregate is scarcely observed;
Δ: only minor formation of aggregate is observed;
X: formation of aggregate is observed.

[Transparency of Coating Layer]

A sample of coating layer liquid is applied onto a surface of PET sheet (I.C.I. Japan, Melinex 705), at an application rate of 20 g/m$^2$ with a bar coater, to form a coating layer on said PET sheet. Haze of the sheet obtained is measured following the measurement method of JIS K 7136 with a hazemeter (Suga Tester Co., Color Computer) and transparency of the coating layer is evaluated according to the following standard:

OO: Haze not higher than 50%
O: Haze 50%-60%
Δ: Haze 60%-70%
X: Haze 70% or higher.

Example 1

Six (6) L of sodium silicate solution (SiO2 concentration, 10 g/L; molar ratio x=3.4) was charged in a reaction tank as an initial reaction liquid, and while being mixed with propeller type stirring blades, heated to an elevated temperature of 95° C. Further stirring the initial reaction liquid while maintaining its temperature at 95° C., a sodium silicate solution (SiO$_2$ concentration, 180 g/L; molar ratio x=3.4) and sulfuric acid (concentration, 221 g/L) were added thereto simultaneously at the respective rates of 32 mL/min. and 12 mL/min., over 50 minutes.

During this operation, the pH of the reaction liquid was 10.2-10.5. After said simultaneous addition was completed, the stirring was continued for further 40 minutes while maintaining the temperature of 95° C. Then said sulfuric acid was added until the system pH dropped to 3.0, to provide a reaction slurry. Its silica solid concentration was 42 g/L.

The reaction slurry was filtered under reduced pressure and washed with ion-exchange water to provide a silica cake. Physical properties of this silica cake were measured with the following results: water content, 89.5 wt %; pH of 5% dispersion, 5.1; electric conductivity, 164 µS/cm; and n-value, 2.4. The BET specific surface area of the silica was 276 m²/g.

Example 2

Operations similar to those in Example 1 were conducted, except that the sodium silicate solution added to the initial reaction liquid had a $SiO_2$ concentration of 270 g/L, its addition rate was made 21 mL/min. and the sulfuric acid was added after termination of the simultaneous addition, until the pH became 4.5.

The pH during the simultaneous addition was 10.4-10.6. Also the silica solid concentration at the ending time of the reaction was 45 g/L.

The physical properties of the silica cake obtained from the reaction slurry through the steps of filtration, washing and dewatering were as follows: water content, 89.0 wt %; pH of the 5% dispersion, electric 6.4; electric conductivity, 136 µS/cm; and n-value, 2.5. The BET specific surface area of the silica was 265 m²/g.

Example 3

5.9 Litters of 0.1 mol/L aqueous sodium hydroxide solution was charged in a reaction tank as an initial reaction liquid, and while being mixed with propeller type stirring blades, heated to an elevated temperature of 93° C. To this initial reaction liquid, a sodium silicate solution ($SiO_2$ concentration, 180 g/L; molar ratio x=3.4) and sulfuric acid (concentration, 221 g/L) were added simultaneously at the respective rates of 42 mL/min. and 12 mL/min., over 40 minutes.

During this operation, the pH of the reaction liquid was 10.0-10.2. After said simultaneous addition was completed, the stirring was continued for further 20 minutes while maintaining the temperature of 93° C. Then said sulfuric acid was added until the system pH dropped to 3.4, to provide a reaction slurry. Its silica solid concentration was 36 g/L.

The reaction slurry was filtered under reduced pressure and washed with ion-exchange water to provide a silica cake. Physical properties of this silica cake were measured with the following results: water content, 89.6 wt %; pH of 5% dispersion, 4.6; electric conductivity, 229 µS/cm; and n-value, 2.9. The BET specific surface area of the silica was 316 m²/g.

Example 4

6.3 Litters of water was charged in a reaction tank as an initial reaction liquid and heated to 93° C. under mixing with propeller type stirring blades. Further stirring the initial reaction liquid, a sodium silicate solution ($SiO_2$ concentration, 270 g/L; molar ratio x=3.4) and sulfuric acid (concentration, 221 g/L) were added thereto simultaneously at the respective rates of 37 mL/min. and 21 mL/min., over 30 minutes.

During this operation, the pH of the reaction liquid was 9.3-9.6. After said simultaneous addition was completed, the stirring was continued for further 10 minutes while maintaining the temperature of 93° C. Then said sulfuric acid was added until the system pH dropped to 3.1, to provide a reaction slurry. Its silica solid concentration was 37 g/L.

The reaction slurry was filtered under reduced pressure and washed with ion-exchange water to provide a silica cake. Physical properties of this silica cake were measured with the following results: water content, 91.5 wt %; pH of 5% dispersion, 3.6; electric conductivity, 247 µS/cm; and n-value, 2.9. The BET specific surface area of the silica was 337 m²/g.

Example 5

6.2 Litters of water was charged in a reaction tank as an initial reaction liquid, and heated to 94° C. under mixing with propeller-type stirring blades. To this initial reaction liquid, a sodium silicate solution ($SiO_2$ concentration, 270 g/L; molar ratio x=3.4) and sulfuric acid (concentration, 221 g/L) were added thereto simultaneously at the respective rates of 19 mL/min. and 9.7 mL/min., over 60 minutes.

During this operation, the pH of the reaction liquid was 9.5-9.8. After said simultaneous addition was completed, the stirring was continued for further 30 minutes while maintaining the temperature of 94° C. Then said sulfuric acid was added until the system pH dropped to 3.2, to provide a reaction slurry. Its silica solid concentration was 38 g/L.

The reaction slurry was filtered under reduced pressure and washed with ion-exchange water to provide a silica cake. Physical properties of this silica cake were measured with the following results: water content, 88.6 wt %; pH of 5% dispersion, 4.9; electric conductivity, 92 kµS/cm; and n-value, 2.4. The BET specific surface area of the silica was 257 m²/g.

Comparative Example 1

Eight (8) L of a sodium silicate solution ($SiO_2$ concentration, 50 g/L; molar ratio x=3.2) and 92 g of sodium sulfate were charged in a reaction tank, and to which sulfuric acid (221 g/L) was added at a rate of 31 mL/min. for 15 minutes, at 40° C. under stirring. Then the temperature of the reaction liquid was raised to 95° C. under stirring. While maintaining said temperature of 95° C., said sulfuric acid was added at a rate of 5.1 mL/min until pH of the reaction mixture became 5.5. Thus formed precipitated silica was filtered and washed by the operations similar to those in Example 1.

The results of measuring the physical properties of the resulting silica cake were as follows: water content, 88.9 wt %; pH of 5% dispersion, 6.0, and the n-value, 1.6. BET specific surface area of said precipitated silica was 280 m²/g.

Comparative Example 2

2.2. Litters of a sodium silicate solution ($SiO_2$ concentration, 10 g/L; molar ratio x=3.4) was charged in a reaction tank and the reaction temperature was maintained at 87° C., into which a sodium silicate solution ($SiO_2$ concentration, 90 g/L; molar ratio x=3.4) and sulfuric acid (concentration, 221 g/L) were added simultaneously at the respective rates of 38 mL/min. and 6.5 mL/min., over 110 minutes. In the meantime, the pH of the reaction liquid was 10.0-10.3. After the simultaneous addition was completed, stirring was continued for further 10 minutes, while maintaining said 87° C. Subsequently said sulfuric acid was added until the system pH dropped to 3.5, to provide a reaction slurry. Its silica solid concentration was 55 g/L.

The reaction slurry was filtered and washed, and physical properties of the resulting silica cake were measured with the following results: water content, 87.3 wt % and pH of the 5% dispersion was 5.4. The n-value was 0.9. Furthermore, BET specific surface area of the silica was 197 m²/g.

Comparative Example 3

Silica cake which was obtained by the method similar to Example 1 was dried in a dryer maintained at 120° C. for 20 hours, and then left standing in a room for further 24 hours. The cake was pulverized in a coffee mill to provide a silica powder.

The water content of the resulting silica powder was 6.1 wt %, and n-value of the silica dispersion was 0.6.

Comparative Example 4

2.5 Litters of sodium silicate solution ($SiO_2$ concentration, 10 g/L; molar ratio x=3.4) was charged in a reaction tank, and maintained at a reaction temperature of 80° C., into which a sodium silicate solution ($SiO_2$ concentration, 90 g/L; molar ratio x=3.4) and sulfuric acid (concentration, 221 g/L) were added simultaneously at respective rates of 40 mL/min. and 6.8 mL/min., over 115 minutes. In the meantime, pH of the reaction liquid was 10.1-10.5. After the end of said simultaneous addition, stirring was continued for further 10 minutes while maintaining 80° C., followed by addition of said sulfuric acid until the pH dropped to 3.4. The silica solid concentration of whereupon obtained reaction slurry was 55 g/L.

The reaction slurry was filtered and washed, and physical properties of the resulting silica cake were measured with the following results: water content, 86.5 wt % and pH of the 5% dispersion, 6.0. The n-value was 1.2, and BET specific surface area of the silica was 244 $m^2/g$.

Example 6

The silica cake as obtained in Example 1 was slurried with colloid mill (PUC Co., Colloid Mill K60) and diluted with a prescribed amount of ion-exchange water, to provide a silica slurry of 10 wt % in silica concentration. This silica slurry was given a fine pulverization treatment with a high-pressure homogenizer (Nanomizer, Nanomizer LA-31) at an operation pressure of 78 MPa, to provide a precipitated silica dispersion. The average particle size of the silica in the precipitated silica dispersion was 137 nm, and the ratio of the particles of a size 500 nm or more was 0.6 vol. %.

Example 7

A precipitated silica dispersion was obtained in the manner similar to Example 6, except that the silica cake was replaced with that which was obtained in Example 2. The average particle size of the silica in the formed precipitated silica dispersion was 133 nm, and the ratio of the particles of a size 500 nm or more was 0.5 vol. %.

Example 8

A precipitated silica dispersion was obtained in the manner similar to Example 6, except that the silica cake was replaced with that which was obtained in Example 3. The average particle size of the silica in the formed precipitated silica dispersion was 112 nm, and the ratio of the particles of a size 500 nm or more was 0 vol. %.

Example 9

A precipitated silica dispersion was obtained in the manner similar to Example 6, except that the silica cake was replaced with that which was obtained in Example 4. The average particle size of the silica in the formed precipitated silica dispersion was 100 nm, and the ratio of the particles of a size 500 nm or more was 0 vol. %.

Example 10

A precipitated silica dispersion was obtained in the manner similar to Example 6, except that the silica cake was replaced with that which was obtained in Example 5. The average particle size of the silica in the formed precipitated silica dispersion was 140 nm, and the ratio of the particles of a size 500 nm or more was 0.2 vol. %.

Comparative Example 5

A precipitated silica dispersion was obtained in the manner similar to Example 6, except that the silica cake was replaced with that which was obtained in Comparative Example 1. The average particle size of the silica in the formed precipitated silica dispersion was 380 nm, and the ratio of the particles of a size 500 nm or more was 12.9 vol. %.

Comparative Example 6

A precipitated silica dispersion was obtained in the manner similar to Example 6, except that the silica cake was replaced with that which was obtained in Comparative Example 2. The average particle size of the silica in the formed precipitated silica dispersion was 346 nm, and the ratio of the particles of a size 500 nm or more was 13.1 vol. %.

Comparative Example 7

Into 893 g of ion-exchange water, 107 g of the silica powder which had been obtained in Comparative Example 3 (water content, 6.1 wt %) was gradually added, while being dispersed with a homogenizer (IKA, Homogenizer T-25), to provide a silica slurry of 10 wt % in silica concentration. This silica slurry was given a fine pulverization treatment with a high-pressure homogenizer (Nanomizer, Nanomizer LA-31) at an operation pressure of 78 MPa, to provide a precipitated silica dispersion. The average particle size of the silica in the precipitated silica dispersion was 18.5 µm, and the ratio of the particles of a size 500 nm or more was 94.5 vol. %.

Comparative Example 8

A precipitated silica dispersion was obtained in the manner similar to Example 6, except that the silica cake was replaced with that which was obtained in Comparative Example 4. The average particle size of the silica in the formed precipitated silica dispersion was 320 nm, and the ratio of the particles of a size 500 nm or more was 11.1 vol. %.

Example 11

The silica cake as obtained in Example 1 was slurried with a colloid mill (PUC Co., Colloid Mill K60). Diluting the slurry with a prescribed amount of ion-exchange water to provide a slurry of 10 wt % in silica concentration. To 500 g of this silica slurry, 12.5 g of an aqueous cationic polymer solution containing diallylmethylamine hydrochloride polymer at a concentration of 20 wt % was added and mixed with an ultramixer (Mizuho Kogyo, Ultramixer LR-2) to provide a liquid premixture. The liquid premixture was subjected to a fine pulverization treatment with a high-pressure homogenizer (Nanomizer, Nanomizer LA-31) at an operation pressure of 78 MPa, to provide a cationic polymer-modified precipitated silica dispersion. The average particle size of the silica in the formed cationic polymer-modified precipitated silica dispersion was 193 nm, and the ratio of the particle of a size equaling to or more than 500 nm was 3.6 vol. %.

Example 12

A cationic polymer-modified precipitated silica dispersion was obtained in the manner similar to Example 11, except that the silica cake was replaced with the one which was obtained in Example 2. The average particle size of the silica in the formed cationic polymer-modified precipitated silica dispersion was 171 nm, and the ratio of the particles of a size equaling to or more than 500 nm was 2.6 vol. %.

Comparative Example 9

A cationic polymer-modified precipitated silica dispersion was obtained in the manner similar to Example 11, except that the silica cake was replaced with the one which was obtained in Comparative Example 1. The average particle size of the silica in the formed cationic polymer-modified precipitated silica dispersion was 3,584 nm, and the ratio of the particles of a size equaling to or more than 500 nm was 34.9 vol. %.

Comparative Example 10

A cationic polymer-modified precipitated silica dispersion was obtained in the manner similar to Example 11, except that the silica cake was replaced with the one which was obtained in Comparative Example 2. The average particle size of the silica in the formed cationic polymer-modified precipitated silica dispersion was 433 nm, and the ratio of the particles of a size equaling to or more than 500 nm was 15.4 vol. %.

Example 13

Fifty (50) g of the precipitated silica dispersion as obtained in Example 6 and 25 g of an aqueous polyvinyl alcohol solution of 10 wt % in concentration (KURARAY, PVA 117) were mixed by agitation with a propeller mixer to provide a coating liquid. Physical properties of the resulting coating liquid were as shown in Table 1.

Example 14

A coating liquid was prepared in the manner similar to Example 13, except that the precipitated silica dispersion was replaced with the one which was obtained in Example 7. Physical properties of the resulting coating liquid were as shown in Table 1.

Example 15

A coating liquid was prepared in the manner similar to Example 13, except that the precipitated silica dispersion was replaced with the one which was obtained in Example 8. Physical properties of the resulting coating liquid were as shown in Table 1.

Example 16

A coating liquid was prepared in the manner similar to Example 13, except that the precipitated silica dispersion was replaced with the one which was obtained in Example 9. Physical properties of the resulting coating liquid were as shown in Table 1.

Example 17

A coating liquid was prepared in the manner similar to Example 13, except that the precipitated silica dispersion was replaced with the one which was obtained in Example 10. Physical properties of the resulting coating liquid were as shown in Table 1.

Comparative Example 11

A coating liquid was prepared in the manner similar to Example 13, except that the precipitated silica dispersion was replaced with the one which was obtained in Comparative Example 5. Physical properties of the resulting coating liquid were as shown in Table 1.

Comparative Example 12

A coating liquid was prepared in the manner similar to Example 13, except that the precipitated silica dispersion was replaced with the one which was obtained in Comparative Example 6. Physical properties of the resulting coating liquid were as shown in Table 1.

Comparative Example 13

A coating liquid was prepared in the manner similar to Example 13, except that the precipitated silica dispersion was replaced with the one which was obtained in Comparative Example 7. Physical properties of the resulting coating liquid were as shown in Table 1.

Comparative Example 14

A coating liquid was prepared in the manner similar to Example 13, except that the precipitated silica dispersion was replaced with the one which was obtained in Comparative Example 8. Physical properties of the resulting coating liquid were as shown in Table 1.

Example 18

Fifty (50) g of the cationic polymer-modified precipitated silica dispersion as obtained in Example 11 and 25 g of an aqueous polyvinyl alcohol solution of 10 wt % in concentration (KURARAY, PVA 117) were mixed by agitation with a propeller mixer to provide a coating liquid. Physical properties of the resulting coating liquid were as shown in Table 1.

Example 19

A coating liquid was prepared in the manner similar to Example 18, except that the cationic polymer-modified precipitated silica dispersion was replaced with the one as obtained in Example 12. Physical properties of the resulting coating liquid were as shown in Table 1.

Comparative Example 15

A coating liquid was prepared in the manner similar to Example 18, except that the cationic polymer-modified precipitated silica dispersion was replaced with the one as obtained in Comparative Example 9. Physical properties of the resulting coating liquid were as shown in Table 1

Comparative Example 16

A coating liquid was prepared in the manner similar to Example 18, except that the cationic polymer-modified precipitated silica dispersion was replaced with the one as obtained in Comparative Example 10. Physical properties of the resulting coating liquid were as shown in Table 1.

TABLE 1

| | Coating Liquid | | Coating Layer |
|---|---|---|---|
| | transmission % | stability | transparency |
| Example 13 | 40 | ◯ | ◯◯ |
| Example 14 | 41 | ◯ | ◯◯ |
| Example 15 | 60 | ◯ | ◯◯ |
| Example 16 | 59 | ◯ | ◯◯ |
| Example 17 | 21 | ◯ | ◯ |
| Comparative Example 11 | 17 | ◯ | Δ |
| Comparative Example 12 | 2 | ◯ | X |
| Comparative | 0 | X | X |

TABLE 1-continued

|  | Coating Liquid | | Coating Layer |
|---|---|---|---|
|  | transmission % | stability | transparency |
| Example 13 Comparative Example 14 | 2 | ○ | X |
| Example 18 | 25 | ○○ | ○ |
| Example 19 | 32 | ○○ | ○ |
| Comparative Example 15 | 6 | ○○ | X |
| Comparative Example 16 | 1 | ○○ | X |

INDUSTRIAL APPLICABILITY

As so far explained, the silica cake of the present invention shows very excellent dispersibility in occasions of dispersing the same in polar solvent, regardless of its very small primary particle size. Using this silica cake, highly transparent silica dispersions can be readily obtained. According to the present invention, therefore, productivity of silica dispersions can be drastically improved.

Moreover, coating liquids for ink-jet recoding sheet obtained by mixing such silica dispersions with binder possess such high transparency that the coating liquids diluted to 1.5 wt % in the silica concentration have percent transmission values of 20% or higher. Hence coating layers formed with said coating liquids have higher transparency compared with coating layers formed of conventional precipitated silica. Thus, the present invention enables preparation of ink-jet recording sheet optimum for attaining photographic picture quality.

The invention claimed is:

1. A process for producing an easily dispersible cake of precipitated silica for making a coating liquid for an ink jet recording sheet,
   wherein the precipitated silica has a BET specific surface area of at least 220 $m^2/g$, and
   wherein when ion-exchange water is added to the easily dispersible cake to provide an aqueous dispersion of the silica with a concentration of 5% by weight, said dispersion being stirred with a propeller mixer to affect a preliminary dispersion, a resultant slurry being treated to be dispersed with a high-pressure homogenizer once at a processing pressure of 78 MPa, and further being diluted to reduce the silica concentration to 1.5% by weight, a resultant dispersion has a light-scattering index (n-value) of at least 2,
   said process comprising using an aqueous alkali silicate solution as an initial reaction liquid, wherein said initial reaction liquid is free of an electrolyte and a mineral acid, simultaneously adding an alkali silicate and a mineral acid to the initial reaction liquid to form a reaction liquid, wherein the pH of the reaction liquid is maintained at a fixed value within a range of 7.5-11.5, with a variation width being ±0.3, and the temperature of the reaction liquid is maintained at 92-98° C., so as to form precipitated silica in a concentration of not higher than 50 g/L, wherein no mineral acid or electrolyte is added to the initial reaction liquid prior to simultaneously adding the alkali silicate and the mineral acid; and separating said precipitated silica from said reaction liquid in a wet state, so as to obtain said easily dispersible cake of precipitated silica.

* * * * *